United States Patent [19]

Horton

[11] Patent Number: 5,797,307
[45] Date of Patent: Aug. 25, 1998

[54] PORTABLE COMBINATION TABLE, CROSS-CUT, RIP-CUT, AND MITER SAW

[76] Inventor: Edward H. Horton, 7 Seneca St., Ocean Bay Park, N.Y. 11706

[21] Appl. No.: 762,995

[22] Filed: Dec. 10, 1996

[51] Int. Cl.$^6$ .................................................. B26D 1/04
[52] U.S. Cl. ..................... 83/471.3; 83/468.3; 83/472.2; 83/485; 83/581
[58] Field of Search .................................. 83/477.2, 581, 83/471.1, 468.3, 471.3, 485, 489

[56] References Cited

U.S. PATENT DOCUMENTS

| | | | |
|---|---|---|---|
| 2,719,547 | 10/1955 | Gjerde | 83/477.2 X |
| 3,280,861 | 10/1966 | Gjerde | 83/477.1 X |
| 3,901,498 | 8/1975 | Novak | 83/477.2 X |
| 3,905,263 | 9/1975 | Smith | 83/477.2 |
| 3,931,751 | 1/1976 | Simonson | 83/477.2 X |
| 3,946,631 | 3/1976 | Malm | 83/477.1 X |
| 3,964,361 | 6/1976 | Allaire | 83/477.2 X |
| 4,002,094 | 1/1977 | Erickson et al. | 83/477.2 X |
| 4,276,799 | 7/1981 | Muehling | 83/477.2 X |
| 4,399,728 | 8/1983 | Davis | 83/477.2 X |
| 4,502,518 | 3/1985 | Lewin | 83/477.2 X |
| 4,860,807 | 8/1989 | Vacchiano | 83/477.2 X |
| 4,916,994 | 4/1990 | Hatala | 83/477.2 X |
| 4,962,685 | 10/1990 | Hagstrom | 83/477.2 X |
| 5,159,864 | 11/1992 | Wedemeyer et al. | 83/477.2 X |
| 5,230,269 | 7/1993 | Shiotani et al. | 83/477.2 X |

FOREIGN PATENT DOCUMENTS

| | | | |
|---|---|---|---|
| 21448 | 1/1981 | European Pat. Off. | 83/477.2 |
| 2904685 | 8/1980 | Germany | 83/477.2 |

OTHER PUBLICATIONS

Delta International Machinery Corp., "10' Contractors' Saw: Intruction Manual", including pictorial drawings depicting blade height and angle adjustment assembly, pp. 1–31, Oct. 1, 1988.

Black & Decker (U.S.) Inc., "Builders' Sawcats & Super Sawcats: Instruction Manual", in English and French with 14 figures of hand–held circular saw, pp. 1–14, Aug. 1986.

Makita Corporation, "Table Saw (Model 2708): Instruction Manual", including pictorial drawings of blade height and angle adjustment assembly, pp. 1–29, Jan. 26, 1988.

Ryobi America Corp., "10' Miter Saw: Owner's Operating Manual", Model Nos. TS–251U, TS–251UDX, including pictorial views of basic operation and alignment procedure of miter saw, pp. 1–17, Aug. 1989.

Primary Examiner—Maurina T. Rachuba
Attorney, Agent, or Firm—Galgano & Burke

[57] ABSTRACT

A portable combination saw which includes a generally horizontally disposed work platform having a circular opening formed therethrough. A circular support is rotatably mounted within the circular opening and has an elongated slot formed therethrough. A motor is movably mounted beneath the circular support such that the blade thereof extends upwardly through the slot and is movable along the slot. A fence mounts across an upper surface of the platform and the circular support. The fence has an arc-like cutout to provide clearance for the blade when it is moved along the slot. Locking devices enable the circular support to be fixed in position relative to the platform and the saw to be fixed in position relative to the slot in the circular support. A blade height and angle adjustment assembly allows the saw blade to be releasably locked at a predetermined angle and height relative to the circular support. Also, disclosed is a portable universal bench for use with a motor and saw blade so as to provide a table saw, cross-cut and rip-cut saw, and miter saw configurations.

16 Claims, 7 Drawing Sheets

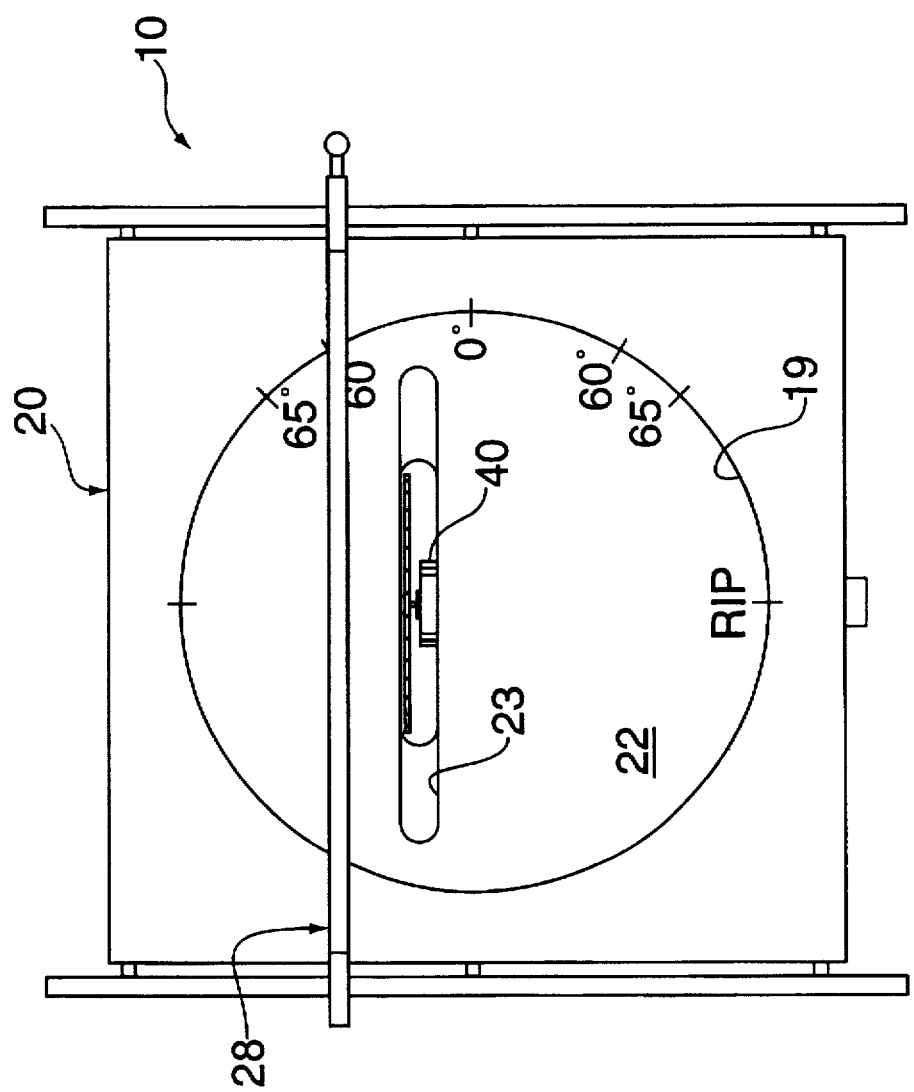

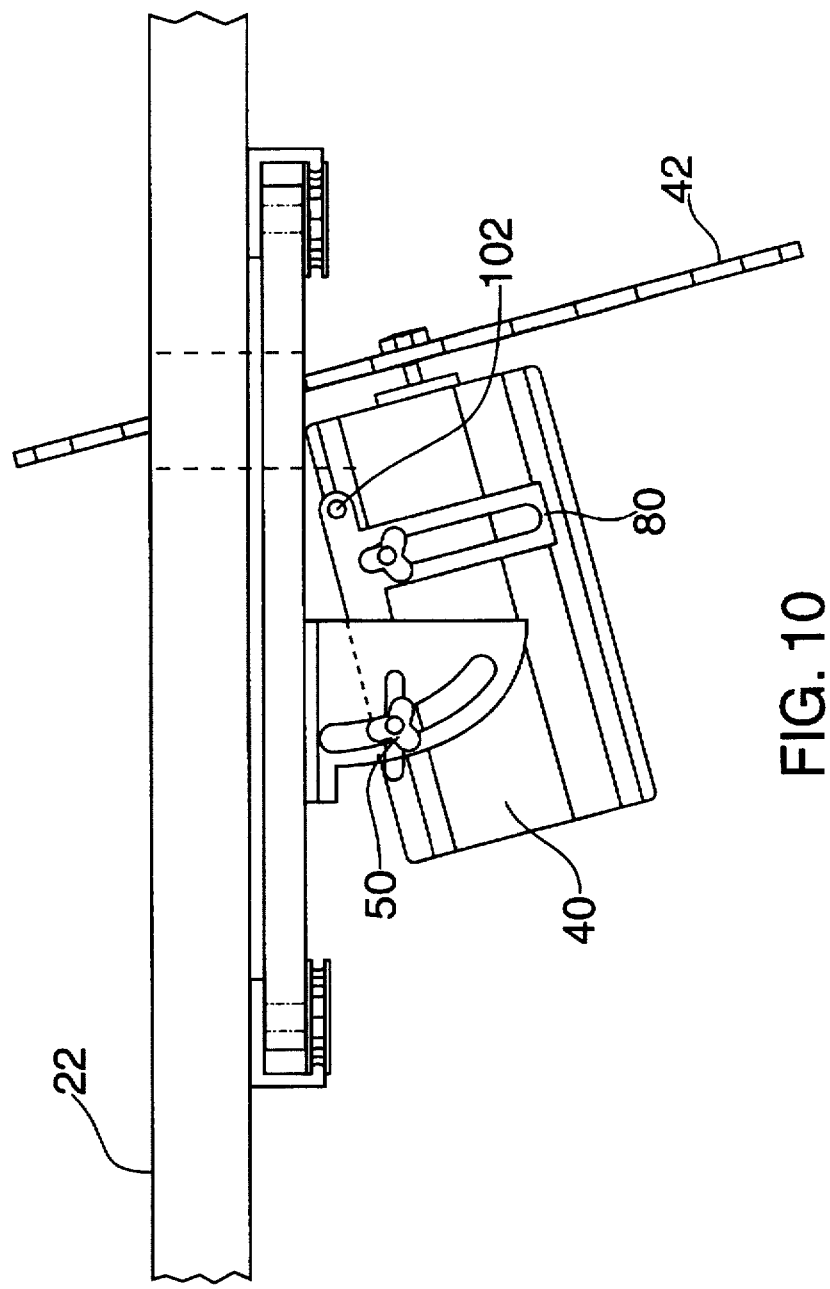

PORTABLE COMBINATION TABLE, CROSS-CUT, RIP-CUT, AND MITER SAW

BACKGROUND OF THE INVENTION

1. Field of the Invention

The present invention relates to a portable combination table, cross-cut, rip-cut, and miter saw. More particularly, it relates to such a combination saw which may be easily transported to the job site to perform a variety of sawing operations.

2. The Prior Art

Table saws, miter saws, circular saws, radial-arm saws, and various other saws are, of course, well-known in the art and are used for performing various sawing and carpentry operations. See, for example, U.S. Pat. Nos. 2,719,547; 3,280,861; 3,901,498; 3,946,631; 3,964,361; 4,002,094; and 4,916,994.

While a well-equipped carpentry shop will have most, if not all, of these saws, it is not practical or feasible to transport all of these tools to a construction job site. Consequently, at a job site carpenters must make do with their most portable tools. To overcome this problem, a variety of combination saws have been proposed, but as far as is known, there presently is no combination saw which acts as a table saw, a radial-arm like cross-cut and rip-cut saw, and a miter saw in an easily portable and facile manner, as does the invention presently proposed.

As used herein the terms "cross-cut" and "rip-cut" mean a cut made by moving a saw blade through a piece of wood that is held stationary and in the direction across the grain and with the grain of the wood, respectively.

As used herein the terms "cross-cutting" and "ripping" mean a cut made by moving a piece of wood in the direction across the grain, and with the grain of the wood, respectively, past a saw blade which is held stationary.

SUMMARY OF THE INVENTION

Accordingly, it is an object of the present invention to provide a novel portable combination table, cross-cut, rip-cut, and miter saw which is readily transportable to and from a job site.

It is another object of the present invention to provide a combination saw which can be easily configured as a table saw, cross-cut and rip-cut saw, or a miter saw depending on the desired type of cut, accuracy, and effort required to make the cut.

It is also object of the present invention to provide a combination saw which can be configured similar to a radial-arm saw for making cross-cuts, rip-cuts, and miter-cuts, i.e., a piece of wood is held stationary, e.g., clamped or held in position, while a motor-driven saw blade is moved relative thereto to make the cut.

It is still another object of the present invention to provide a combination saw which can be configured as a table saw for cross-cutting and ripping in which a motor-driven saw is held in a fixed position while a piece of wood is guided and moved relative thereto.

It is still yet another object of the present invention to provide a combination saw having a motor-driven saw in which the blade is positionable at various angles of inclination from a vertical plane to make various angled and compound cuts.

It is a further object of the present invention to provide such a combination saw which is compact, easy to use, reliable in operation, and relatively inexpensive to manufacture for widespread use by carpenters and others.

It is still a further object of the present invention to provide a novel portable universal bench to which a motor-driven saw can be attached so as to provide a table saw, cross-cut and rip-cut saw, and miter saw.

Certain of the foregoing and related objects are readily attained in a portable combination table, cross-cut, rip-cut and miter saw, comprising a generally horizontally disposed work platform having a circular opening formed therethrough. A circular support is rotatably mounted within the circular opening of the platform and includes an elongated slot formed therethrough. Mounting means for movably mounting a motor-driven saw beneath the circular support is provided such that a blade thereof extends upwardly through the slot and is movable along the slot. A fence mounts across an upper surface of the platform and the circular support. The fence has an arc-like cutout to provide clearance for the blade when it is moved along the slot. First and second locking means releasably lock the circular support in a fixed position relative to the platform and the motor-driven saw in a fixed position relative to the slot, respectively.

The movable mounting means comprises L-shaped flanges mounted beneath the circular support which are disposed generally parallel to the slot and which define opposing channels. Movable mounting means also comprises a support shoe slidable between the opposing channels and operably attached to the motor-driven saw. The support shoe preferably includes rollers mounted on lateral ends thereof which rotatably engage the L-shaped flanges.

Preferably, the platform has an outer peripheral edge and a threaded throughbore extending through the outer peripheral edge and opening onto the circular opening thereof and the first locking means comprises a threaded bolt threadably receivable through the throughbore for releasable locking the platform and the circular support in a fixed position. The second locking means comprises a pin operably attached to the movable mounting means and having an end which engages at least one of the circular support and the platform.

Desirably, the combination saw further comprising third means for releasably locking the blade of the motor-driven saw at at least one of a predetermined height and angle relative to the circular support. Desirably, the third locking means comprises an angle bracket having an arcuate traveler slot and a depth slide having an elongated slot.

Certain of the foregoing and related objects are also readily attained in a portable universal bench for use with a motor-driven saw so as to provide a table saw, crosscut and rip-cut saw, and miter saw configurations in which the portable universal bench comprises a generally horizontally disposed work platform having a circular opening formed therethrough. A circular support is rotatably mounted within the circular opening of the platform and has an elongated slot formed therethrough. Mounting means for movably mounting a motor-driven saw beneath the circular support is provided such that a blade thereof extends upwardly through the slot and is movable along the slot. A fence mounts across an upper surface of the platform, the circular support and the slot. The fence has an arc-like cutout to provide clearance for the blade when it is moved along the slot. First and second locking means releasably lock the circular support in a fixed position relative to the platform and the motor-driven saw in a fixed position relative to the slot, respectively.

BRIEF DESCRIPTION OF THE DRAWINGS

Other objects and features of the present invention will become apparent from the following detailed description

Figure 1:
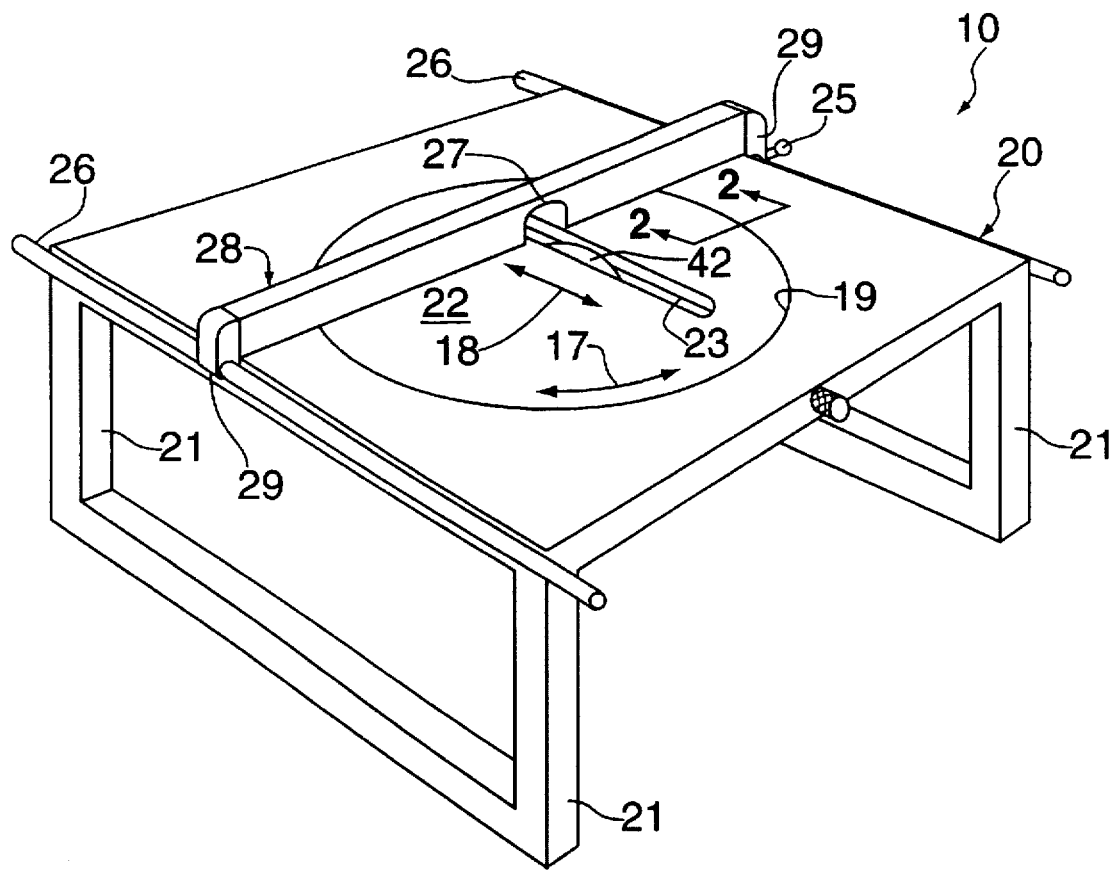

3 considered in connection with the accompanying drawings which disclose one preferred embodiment of the present invention. It should be understood, however, that the drawings are designed for the purpose of illustration only and not as a definition of the limits of the invention.

Figure 2:
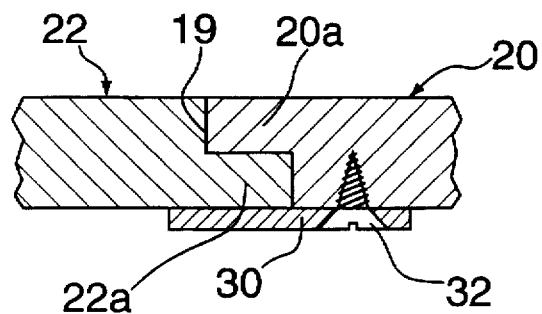
Figure 3:
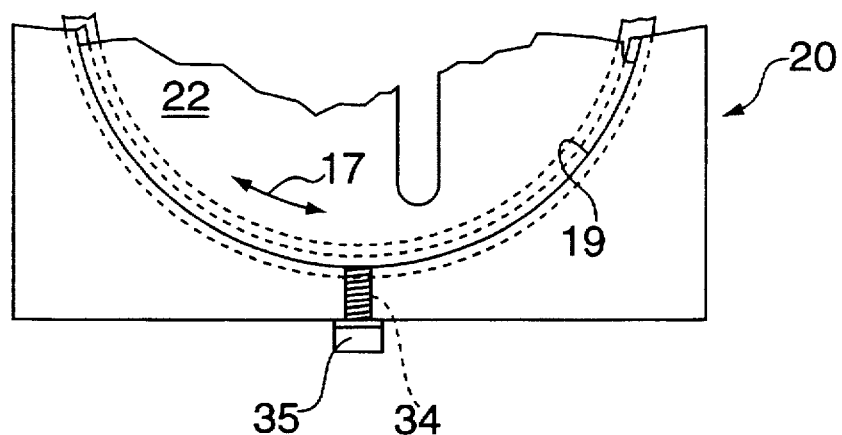
Figure 4:
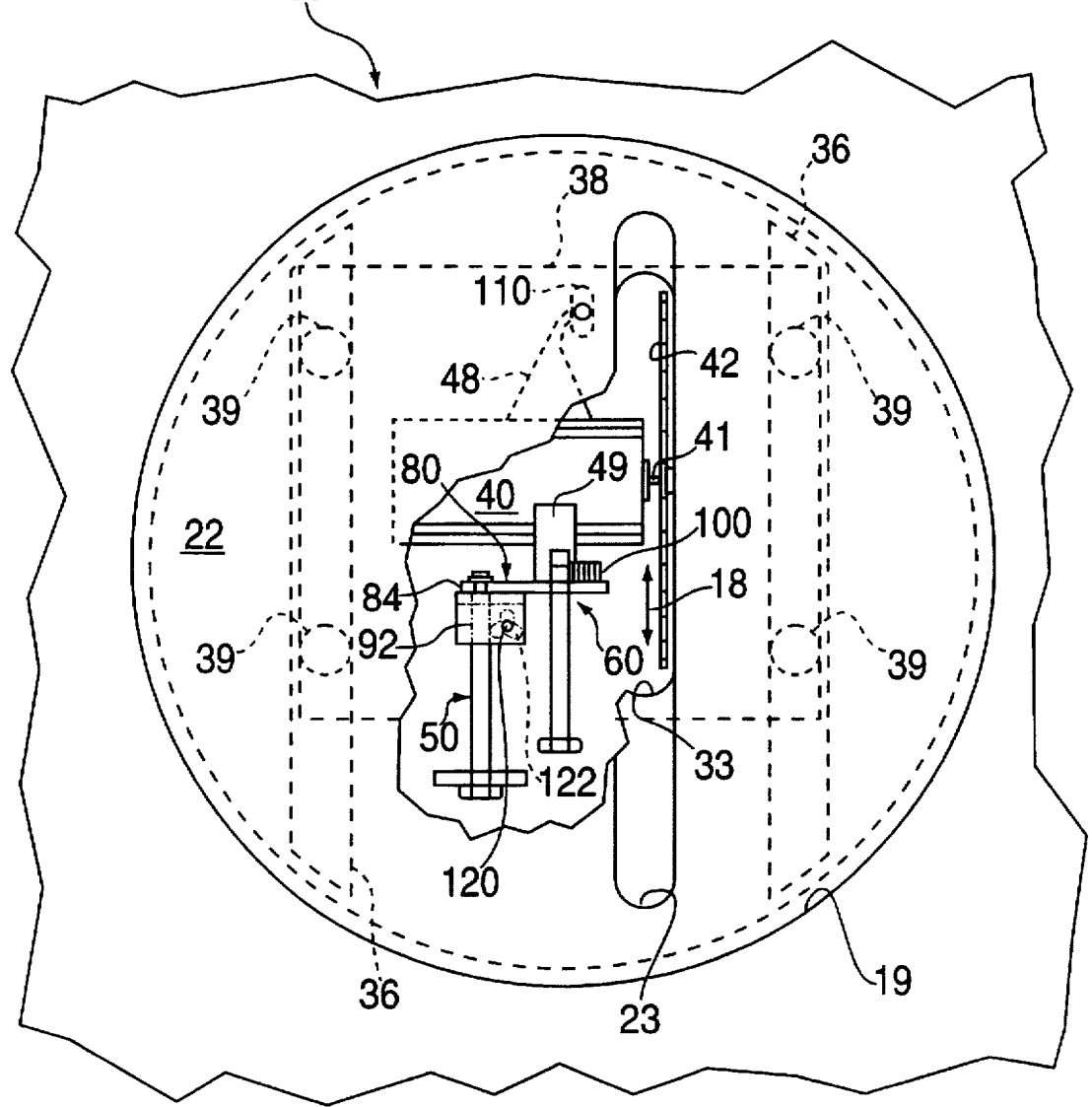
Figure 5:
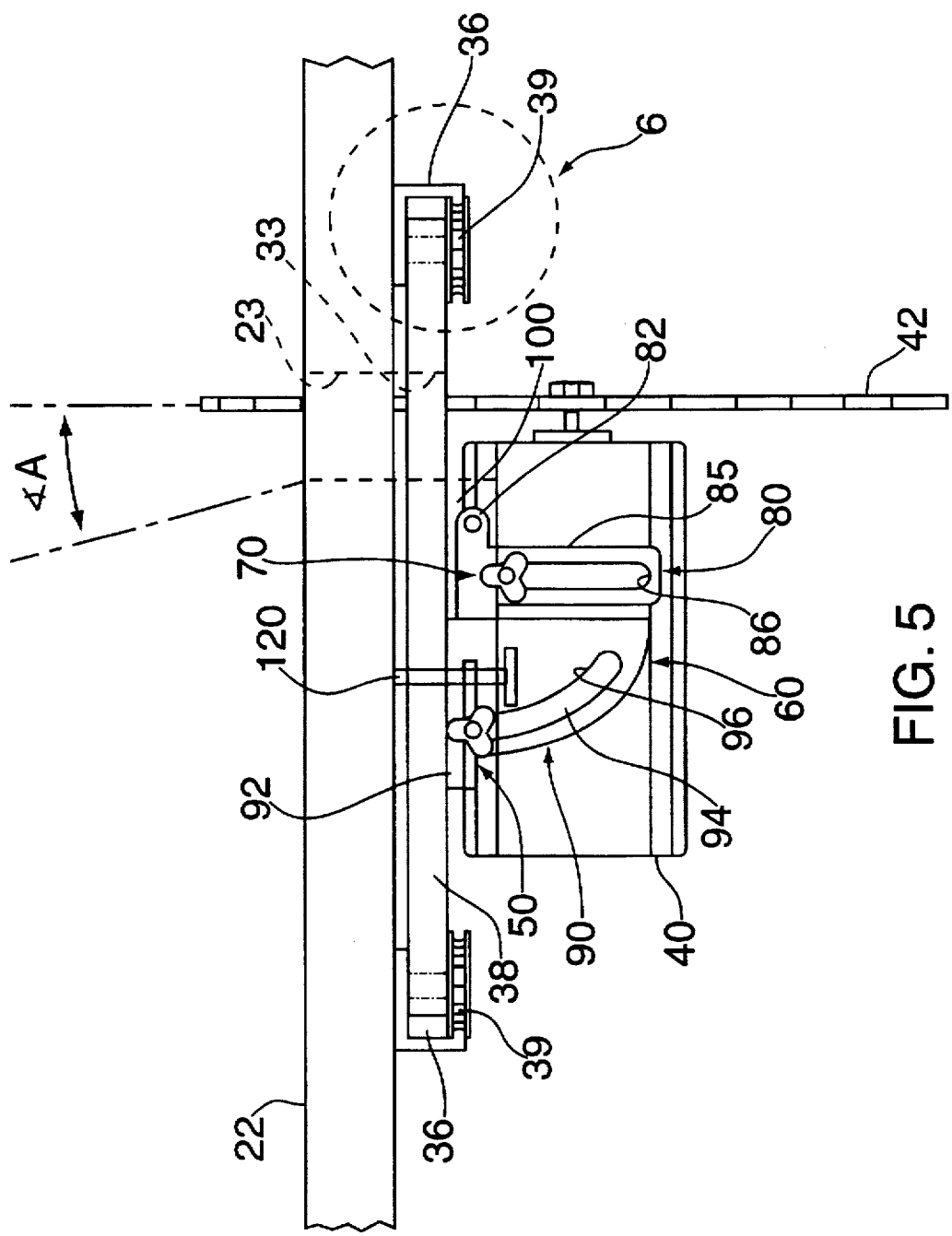
Figure 6:
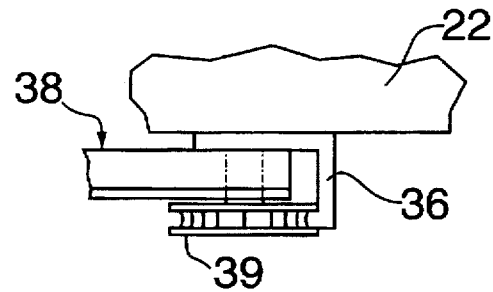
Figure 7:
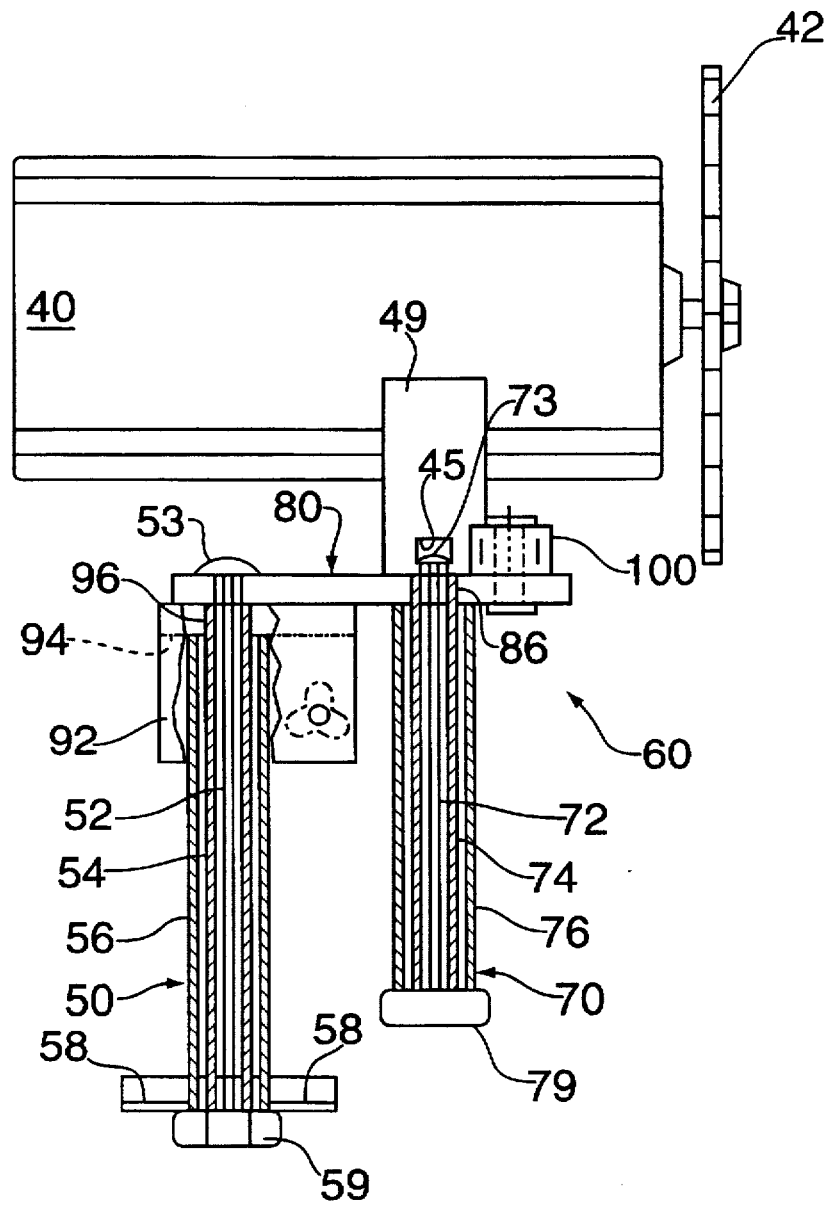
Figure 8:
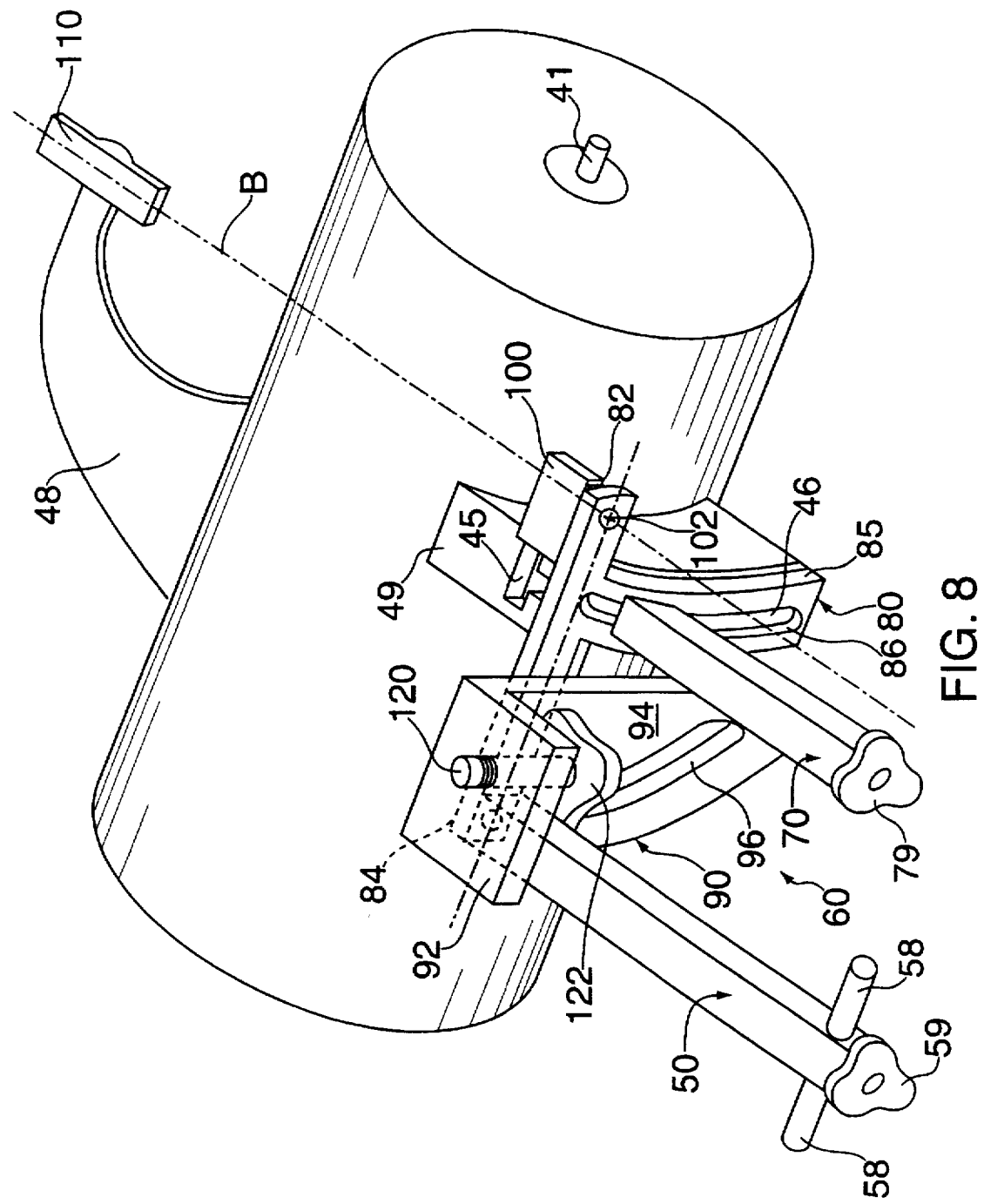

In the drawings, wherein similar reference characters denote similar elements throughout the several views:

FIG. 1 is a perspective view of a portable combination table, cross-cut, rip-cut, and miter saw embodying the present invention;

FIG. 2 is an enlarged cross-sectional view of the combination saw taken along lines 2—2 in FIG. 1;

FIG. 3 is a partial top plan view of the combination saw shown in FIG. 1;

FIG. 4 is an enlarged partial top plan view, partially broken away, of the combination saw shown in FIG. 1;

FIG. 5 is an enlarged partial front side elevational view of the combination saw shown in FIG. 1;

FIG. 6 is an enlarged elevational view of the encircled detail identified by arrow 6 in FIG. 5;

FIG. 7 is an enlarged top plan view of the motor, handle, and height adjustment knob of the combination saw shown in FIG. 1;

FIG. 8 is a partial perspective view of the motor and blade height and angle adjustment assembly of the combination saw shown in FIG. 1;

FIG. 9 is an enlarged top plan view of the combination saw shown in FIG. 1 configured for performing ripping and cross-cutting; and FIG. 10 is an enlarged partial front elevational view of the combination saw shown in FIG. 1, wherein the motor and saw blade are disposed on an angle.

DETAILED DESCRIPTION OF A PREFERRED EMBODIMENT

Turning now in detail to the appended drawings, and in particular FIG. 1 thereof, therein illustrated is a novel portable combination table, cross-cut, rip-cut, and miter saw 10 embodying the present invention which includes a generally horizontally-disposed, stationary work platform 20 supported by spaced-apart legs 21. Platform 20 has a centrally-disposed circular opening 19 formed therethrough in which is rotatably mounted a circular support 22. Circular support 22 has an elongated slot 23 formed therethrough disposed slightly off-set diametrically with respect to circular support 22. A saw blade 42 is disposed within and movable along the length of slot 23 in the directions of the straight double headed arrow 18. A fence 28 is positioned perpendicular to saw blade 42 for making cross-cuts and rip-cuts. As will be explained in greater detail below, circular support 22 can be rotated 90 degrees in the directions of the curved double-headed arrow 17 for cross-cutting and ripping, and circular support 22 can be rotated, typically 45 degrees, for making miter-cuts.

Platform 20 also includes a pair of elongated parallel cylindrical rails 26 joined to opposite lateral sides thereof, which serve as guides for slidably mounting fence 28 which spans across platform 20, circular support 22 and slot 23. Fence 28 has an arc-like cutout 27 to provide for clearance for saw blade 42 when making cross-cuts, rip-cuts, miter-cuts and compound miter-cuts. Fence 28 has a pair of brackets 29, which slidably attach to rails 26. A locking mechanism of conventional design having a pivotable locking handle 25 is attached to one of brackets 29 to releasably lock fence 28 at a desired position on platform 20 (see, e.g.,

4 the fence locking device and guide rail of the Contractors' Saw, Part No. 422-19-651-008 of Delta International Machinery Corp. of Memphis, Tenn.).

As shown in greater detail in FIG. 2, circular support 22 is supported by a flat ring 30 secured to the underside of platform 20 by a plurality of screws 32 (only one of which is shown) and preferably includes a peripherally-extending tongue or shoulder 22a formed therein which is configured and dimensioned to be slidably received between a corresponding tongue 20a of platform 20, and ring 30 which surrounds the circular opening therein. As a result of this arrangement, circular support 22 can be rotatably supported by platform 20.

As can be seen in FIG. 3, platform 20 has a threaded bore 34 formed through one edge thereof in which is received a first locking means which comprises a threaded bolt 35, the inner end of which is disposed to engage circular support 22 to releasably lock the same in a fixed position with respect to platform 20.

As shown in FIGS. 4-6 and as seen best in FIGS. 5 and 6, the underside of circular support 22 is provided with a pair of parallel, generally L- or C-shaped flanges 36 disposed on opposite sides of slot 23. Flanges 36, of the moveable mounting means, define opposing tracks or channels for receiving a slidable mount or support shoe 38 attached to a motor 40, the construction of which is explained in greater detail below. As shown best in FIG. 6, the lateral ends of support shoe 38 are each provided with a pair of freely-rotatable rollers or roller bearing wheels 39 which are rotatably received on the lower leg of the L-shaped flanges 36 for easy sliding movement in the direction of double headed arrow 18 (FIG. 4).

As shown in FIGS. 4 and 5, support shoe 38 includes an elongated slot 33 disposed in corresponding relationship to slot 23 through which blade 42 is permitted to extend. As a result of this mounting, blade 42 mounted on a shaft 41 of motor 40 extends upwardly through slots 23 and 33 (preferably about 2 and ½ inches above the top surface of circular support 22 for an 8 inch cutting blade) and is movable therealong when it is desired to perform a cross-cut, rip-cut, and miter-cut type sawing operation. Motor 40 is preferably provided with a conventional pivotable spring-loaded blade guard (not shown) for added safety.

An elongated handle 50 is attached to motor 40 by which it may be held by an operator safely away from blade 42 and reciprocated in the direction of the double-headed arrow 18 in slot 23 to perform cross-cuts, rip-cuts and miter-cuts. Slot 23 is preferably dimensioned to be approximately 18 and ½ inches long by 2 inches wide so as to allow for cuts up to 12 inches on ¾ inch thick lumber.

Referring now to FIGS. 4, 5, 7 and 8 and in particular to FIGS. 4 and 8, a blade height and angle adjustment assembly 60 operably attaches motor 40 to support shoe 38. Assembly 60 includes a depth slide 80, a third locking means comprising an angle bracket 90, a pivot retainer 100 and a ball pivot 110. As will become apparent from the following description, assembly 60 attaches at three points to the underside of support shoe 38 via pivot retainer 100, ball pivot 110, and a leg 92 of angle bracket 90.

Depth slide 80 is generally T-shaped having a first end 82 which attaches via a pivot pin 102 (FIG. 8) to pivot retainer 100 and an opposite end 84 which attaches to angle bracket 90 via handle 50 as described in greater detail below.

Disposed between ends 82 and 84 of depth slide 80 is a downwardly depending member 85 having an elongated slot 86. An elongated adjustment knob 70 allows varying the height of motor 40, and thus blade 42 with respect to circular support 22. In particular, motor 40 is permanently attached to a motor extension 48 which pivotally attaches to ball pivot 110 and motor 40 is permanently attached to a motor extension 49 which adjustably attaches to knob 70. By adjusting knob 70, described below, motor 40 can be pivotally raised and lowered by positioning knob 70 along elongated slot 86. Downwardly depending member 85 of depth slide 80 is curved so as to remain adjacent motor extension 49 when motor 40 is pivotally raised and lowered.

As seen best in FIG. 5, angle bracket 90 includes a first horizontally extending leg 92 which attaches to support shoe 38 and a downwardly depending generally triangular-shaped leg 94 having an arcuate-like blade angle traveler slot 96 through which handle 50 extends to allow motor 40 and blade 42 to be pivoted within the angle range defined by angle A. By positioning handle 50 along slot 96, motor 40 can be pivoted along an axis B (FIG. 8) between ball pivot 110 and pivot retainer 100 so as to vary angle A (FIG. 5). As best seen in FIG. 10, by adjusting handle 50, motor 40 and blade 42 can be disposed in an angled position relative to circular support 22. As illustrated in FIG. 10, depth slide 80 pivots about pin 102.

As shown in greater detail in FIG. 7, handle 50 comprises a centrally-disposed, elongated bolt 52 having a bolt head 53, which is received within an inner tube 54 which, in turn, is received within and an outer tube 56. Laterally extending posts 58 are attached to the outer end of tube 56 and a locking nut 59 is threadably attached to the outer threaded end of bolt 52. In particular, bolt 52 is passed through a circular bore in end 84 of depth slide 80 and is telescopically receivable and slidable with respect to inner tube 54 which is telescopically receivable and slidable with respect to outer tube 56. In addition, inner tube 54 is longer than outer tube 56 and inner tube 54 has an inner end which extends through slot 96 in angle bracket 90 while outer tube 56 has an inner end which abuts the front surface of leg 94 of angle bracket 90. Tightening locking nut 59 on bolt 52 releasably clamps handle 50 to angle bracket 90 in a fixed position with respect to depth slide 80 to releasably lock the angle of blade 42 and securely retain handle 50 in place. Loosening locking nut 59 allows handle 50 to slide along slot 96 for adjusting the angle of blade 42. More specifically, the clamping action is achieved by the compressive forces exerted by the inner end of outer tube 56 against the front surface of triangular-shaped leg 94 of angle bracket 90 and by bolt head 53 against the rear surface of end 84 of depth slide 80.

Knob 70 comprises a centrally-disposed, elongated bolt 72 having a bolt head 73, which is received within an inner tube 74, which, in turn, is received within an outer tube 76. A locking nut 79 is threadably attached to the outer threaded end of bolt 72. In particular, bolt 72 is passed through a slot 46 in motor extension 49, slot 86 in depth slide 80, and is telescopically receivable and slidable with respect to inner tube 74, which is telescopically receivable and slidable with respect to outer tube 76. In addition, inner tube 74 is longer than outer tube 76 and inner tube 74 has an inner end which extends through slot 86 in depth slide 80 while outer tube 76 has an inner end which abuts the front surface of depending member 85 of depth slide 80. Tightening locking nut 79 on bolt 72 releasably clamps adjustment knob 70 to depth slide 80 in a fixed position relative to motor extension 49 to releasably lock the height of blade 42 and securely retain knob 70 in place. Loosening locking nut 79 allows knob 70 to slide along slots 86 and 46 for adjusting the height of blade 42. More specifically, the clamping action is achieved by the compressive forces exerted by the inner end of outer tube 76 against the front surface of depending member 85 of depth slide 80 and by bolt head 73 against the inner surface of recess 45 adjacent slot 46. Preferably, inner tubes 54 and 74 and outer tubes 56 and 76 have a hollow square cross-section, although other tubes having hollow cross-sections are equally suitable, e.g., tubes having a hollow circular cross-section.

FIG. 9 illustrates combination saw 10 configured as a table saw suitable for performing cross-cutting and ripping. Specifically, when configured for ripping lumber, circular support 22 is locked in positioned relative to platform 20 with slot 23 parallel to fence 28, and motor 40 is locked in a stationary or fixed position with respect to circular plate 22.

Specifically, as shown in FIGS. 4 and 5, threaded locking pin 120 attached to a locking nut 122 extends upwardly through a threaded aperture in support shoe 38 to engage a bottom surface of circular support 22 to thereby releasably lock motor 40 in a stationary or fixed position relative to circular support 22. Preferably, blade 42 is positioned and locked midway between the ends of slot 23 when combination saw is configured for cross-cutting and ripping. Advantageously, a recess (not shown in FIG. 5) in the bottom surface of the circular support can receive pin 120 to better lock the same in a fixed position.

Referring again to FIG. 9, circular support 22 includes preset angle marking to enable various angled cuts to be performed on a workpiece. For making miter cuts, circular support 22 is rotated between the "RIP" position and 0 degrees. Typically, circular support 22 is rotated 45 degrees for making miter-cuts such as when mitering molding and the like. In place of the threaded thumbscrew 34 shown in FIG. 3 for releasably locking the circular support 22 in a fixed position with respect to platform 20, one or more spring-loaded detents or ball bearings can be mounted in the edge of platform 20 and cooperate with and oppose generally semi-circular depressions disposed in the edge of platform 22 at the appropriate angular positions (e.g., 0 degrees, 30 degrees, 45 degrees, 60 degrees, 90 degrees, etc.) to releasably engage the spring-loaded detents and thereby releasably lock the table at the desired angle setting.

As a result of the foregoing construction, combination saw 10 can perform a number of different sawing tasks, including cross-cuts of lumber sized to 12 inches long by 1½ inches thick (using an 8 inch blade as described above), miter-cuts and compound miter-cuts, e.g., 60 degrees×45 degrees, and ripping. Of course, the size of the blade and the corresponding dimensions of the slot can be modified, as desired.

This inventive combination saw can perform a variety of tasks, and it can be used as a miter saw, compound miter saw, table saw, and radial-arm saw with little significant set-up time required for these different functions. The saw also affords certain significant advantages over the various conventional saws which are used for this purpose. For example, although a table saw can be used for cross-cutting, one must move material through the blade which can be relatively impossible when cross-cutting, for example, two inches off a sixteen foot piece of lumber. Similarly, although a radial-arm saw can make cross-cut and rip-cuts, ripping is dangerous, and keeping the blade in alignment when transporting the saw from job to job is very difficult.

Furthermore, miter saws and compound miter saws cannot perform ripping operations at all. In addition to the foregoing, when performing cross-cuts with the present saw, the material remains stationary, as a result of which it is possible to cut material essentially having any desired length. In addition, when using the combination saw for cross-cutting or ripping, the operator keeps the good side of the material up for easy visibility of the cutting mark. Furthermore, since the blade rotation is downward, there is no kick and sawing splinters, and if any, they will be on the unfinished side of the material.

Motor 40 is suitably connected to an electrical power source via an on-off switch (not shown). In addition, it is appreciated that legs 21 or the ends of rails 28 can serve as handle grips for easily transporting combination saw 10 to a job site.

While the present invention is illustrated as a combination saw, from the present description it will be appreciated by those skilled in the art that the combination saw need not be sold with a motor and saw blade, but instead as a universal bench to which a motor and saw blade are attachable so as to provide a table saw, cross-cut and rip-cut saw and miter saw.

Accordingly, while only one embodiment of the present invention for a combination saw and universal bench have been shown and described, it is to be understood that many changes and modifications may be made thereunto without departing from the spirit and scope of the invention as disclosed herein. For example, other mechanisms for angular and height adjustment of a motor could be employed. For example, a rotating knob coupled to an operably connected worm gear can be utilized for height adjustment of the blade and a rotating knob coupled to an operably connected worm gear can be used for angular adjustment of the blade.

In addition, although the L-shaped flanges are shown and illustrated as being disposed on opposite sides of a slot, it is appreciated that a pair of L-shaped flanges can be disposed on the same side of slot 23 thereby eliminating a slot in a support shoe. Further, from the present description, it is appreciated that the elongated slot in the circular support can be positioned along the diameter of the circular support.

What is claimed is:

1. A portable combination table, cross-cut, rip-cut, and miter saw, comprising:
   (a) a generally horizontally disposed work platform having a circular opening formed through said platform;
   (b) a circular support rotatably mounted within said circular opening of said platform and having an elongated slot formed through said circular support, said elongated slot having a longitudinal axis;
   (c) a motor;
   (d) means for movably mounting said motor beneath said circular support wherein when a blade is attached to said motor, the blade extends upwardly through said slot and the blade is movable linearly along said longitudinal axis of said slot;
   (e) a fence mountable across an upper surface of said platform and said circular support, said fence having an cutout to provide clearance for the blade when said blade is moved along said slot;
   (f) first means for releasably locking said circular support in a fixed position relative to said platform; and
   (g) second means for releasably locking said motor in a fixed position relative to said slot.

2. A combination saw according to claim 1, wherein said means for movably mounting said motor comprises L-shaped flanges mounted beneath said circular support and said flanges being disposed generally parallel to said slot to define opposing channels.

3. A combination saw according to claim 2, wherein said means for movably mounting said motor further comprises a support shoe which is movable between said opposing channels.

4. A combination saw according to claim 3, wherein said support shoe comprises lateral ends and rollers mounted on said lateral ends and said rollers rotatably engaging said L-shaped flanges.

5. A combination saw according to claim 1, wherein said platform has an outer peripheral edge and a threaded throughbore extending through said outer peripheral edge, said throughbore opening onto said circular opening of said platform, and said first means for releasably locking said circular support in a fixed position comprises a threaded bolt threadably receivable through said throughbore for releasably locking said platform and said circular support in a fixed position.

6. A combination saw according to claim 1, wherein said second means for releasably locking said motor comprises a pin operably attached to said means for movably mounting said motor and said pin having an end which engages at least one of said circular support and said platform.

7. A combination saw according to claim 1, further comprising third means for releasably locking the blade attached to said motor at a predetermined height and angle relative to said circular support, and said third means for releasably locking the blade attached to said motor being attached to said means for movably mounting said motor.

8. A combination saw according to claim 7, wherein said third locking means for releasably locking the blade attached to said motor at a predetermined height and angle comprises an angle bracket having an arcuate traveler slot and a depth slide having an elongated slot.

9. A portable universal bench for use with a motor and a saw blade so as to provide a table saw, cross-cut and rip-cut saw, and miter saw configurations, said portable universal bench comprising:
   (a) a generally horizontally disposed work platform having a circular opening formed through said platform;
   (b) a circular support rotatably mounted within said circular opening of said platform and having an elongated slot formed through said circular support, said elongated slot having a longitudinal axis;
   (c) means for movably mounting a motor beneath said circular support wherein when a blade is attached to the motor, the blade extends upwardly through said slot and the blade is movable linearly along said longitudinal axis of said slot;
   (d) a fence mountable across an upper surface of said platform and said circular support, said fence having an cutout to provide clearance for the blade when the blade is moved along said slot;
   (e) first means for releasably locking said circular support in a fixed position relative to said platform; and
   (f) second means for releasably locking the motor in a fixed position relative to said slot.

10. A portable universal bench according to claim 9, wherein said means for movably mounting said motor comprises L-shaped flanges mounted beneath said circular support, said flanges being disposed generally parallel to said slot to define opposing channels.

11. A portable universal bench according to claim 10, wherein said means for movably mounting said motor further comprises a support shoe which is movable between said opposing channels.

12. A portable universal bench according to claim 11, wherein said support shoe comprises lateral ends and rollers mounted on said lateral ends, and said rollers rotatably engaging said L-shaped flanges.

13. A portable universal bench according to claim 9, wherein said platform has an outer peripheral edge and a threaded throughbore extending through said outer peripheral edge, said throughbore opening onto said circular opening of said platform, and said first means for releasably locking said circular support in a fixed position comprises a threaded bolt threadably receivable through said throughbore for releasably locking said platform and said circular support in a fixed position.

14. A portable universal bench according to claim 9, wherein said second means for releasably locking the motor comprises a pin operably attached to said means for movably mounting the motor and said pin having an end which engages at least one of said circular support and said platform.

15. A portable universal bench according to claim 9, further comprising third means for releasably locking the blade attached to the motor at a predetermined height and angle relative to said circular support, and said third means for releasably locking the blade attached to the motor being attached to said means for movably mounting the motor.

16. A portable universal bench according to claim 15, wherein said third locking means for releasably locking the blade attached to said motor at a predetermined height and angle comprises an angle bracket having an arcuate traveler slot and a depth slide having an elongated slot.

* * * * *